United States Patent [19]

Rose et al.

[11] Patent Number: 5,724,276
[45] Date of Patent: Mar. 3, 1998

[54] LOGIC BLOCK STRUCTURE OPTIMIZED FOR SUM GENERATION

[75] Inventors: Jonathan S. Rose, Palo Alto; Trevor J. Bauer, Campbell, both of Calif.

[73] Assignee: Xilinx, Inc., San Jose, Calif.

[21] Appl. No.: 664,628

[22] Filed: Jun. 17, 1996

[51] Int. Cl.$^6$ .................................................. G06F 7/50
[52] U.S. Cl. ........................... 364/716.06; 364/784.01
[58] Field of Search ............................ 364/716, 768, 364/784, 786, 785; 326/38, 39

[56] References Cited

U.S. PATENT DOCUMENTS

| | | | |
|---|---|---|---|
| 5,267,187 | 11/1993 | Hsieh et al. | 364/784 |
| 5,436,574 | 7/1995 | Veenstra | 326/39 |
| 5,481,206 | 1/1996 | New et al. | 326/38 |
| 5,481,486 | 1/1996 | Cliff et al. | 364/716 |

OTHER PUBLICATIONS

"The Programmable Logic Data Book", 1994, pp. 2-9 through 2-13, available from Xilinx Inc., 2100 Logic Drive, San Jose, CA 95124.

Primary Examiner—Chuong Dinh Ngo
Attorney, Agent, or Firm—Edel M. Young

[57] ABSTRACT

The present invention is part of a Field Programmable Gate Array logic block which performs arithmetic functions as well as logic functions. The novel structure includes a small amount of extra hardware which can implement the XOR function as well as several other useful functions. With the invention, one-bit adders can be generated using only a single lookup table, a carry multiplexer, and the extra hardware. N-bit adders can be implemented with N lookup tables. Multipliers, adders, counters, loadable synchronous set-reset counters and many other common functions are all more efficiently implemented with the invention.

3 Claims, 8 Drawing Sheets

ADDER BIT

MULTIPLIER BIT

MULTIPLIER BIT

PARITY BIT
GENERATOR

PARALLEL LOADABLE
SET/RESET COUNTER BIT

LOGIC BLOCK STRUCTURE OPTIMIZED FOR SUM GENERATION

FIELD OF THE INVENTION

The invention relates to field programmable integrated circuit devices or FPGAs, particularly to logic blocks which make up the FPGAs.

BACKGROUND OF THE INVENTION

Since the first FPGA was invented in 1984, variations on the basic FPGA have been devised to let the FPGA do specialized functions more efficiently. Special interconnection lines allow adjacent logic blocks to be connected without taking up general interconnection lines. Hardware allowing the carry function to be fast with respect to addition has been placed between adjacent logic blocks. Thus, prior art FPGAs can implement adders and other arithmetic functions at high speed. However, typically, a prior art structure having lookup tables and a carry chain with multiplexers will require two lookup tables to implement one bit of an adder, one pair of lookup tables and one carry multiplexer being used for each digit of the sum. Two 4-input lookup tables are needed because the full adder requires both the sum (the XOR of the two input signals and the carry-in signal from the next lower order bit) and the carry-propagate signal (the XOR of the two input signals alone) for controlling the carry chain. One 4-input lookup table can implement either the sum or the carry-propagate but not both. For other arithmetic functions such as multiply, the number of lookup tables is greater than two per bit.

FIG. 1a shows part of a prior art logic block that includes a carry chain. A typical logic block in FPGA products available from Xilinx, Inc. includes more structures than those shown in FIG. 1a. Such structures are shown at pages 2-9 through 2-13 of the Xilinx 1994 Data Book available from Xilinx, Inc., 2100 Logic Drive, San Jose, Calif. 95124. Such additional structures are also shown by Hsieh et al in FIG. 9 of U.S. Pat. No. 5,267,187 (docket M-1230). As shown in FIG. 1a, the logic block includes two lookup tables LUT F and LUT G, a carry multiplexer CMUX, and a multiplexer F5 for using the two lookup tables to implement one five-input function.

FIG. 1b shows the structure of FIG. 1a configured to implement one bit of an adder. We see in FIG. 1b that the prior art structure of FIG. 1a requires two lookup tables LUT F and LUT G to process one bit of an adder. When the structure of FIG. 1a is configured as in FIG. 1b to implement addition, a carry-in signal from a lower order bit is applied to the 1 input terminal of carry multiplexer CMUX and to an input terminal G1 of lookup table LUT G. The two input signals ai and bi are applied to two input terminals F0 and F1 of lookup table LUT F and to two input terminals G2 and G3 of LUT G. Either of the input signals ai or bi (shown here as ai) is applied to the 0 input terminal of carry-multiplexer CMUX. Lookup table LUT F is configured to generate the XOR function (ai ⊕ bi) of the signals on the F0 and F1 input terminals. Lookup table LUT G is configured to generate the XOR function (ai ⊕ bi ⊕ carry-in) of G1, G2, and G3. The carry-in signal may be routed through general interconnect to carry-in terminal G1, or as shown in FIG. 9 of U.S. Pat. No. 5,267,187 the carry-in signal may be directly routed to and selected by a multiplexer which receives this signal as an input. Thus lookup table LUT F generates the carry propagate signal for controlling multiplexer CMUX. Lookup table LUT G generates the sum.

SUMMARY OF THE INVENTION

The present invention adds a small number of additional circuit elements to the prior art structures. The novel circuit allows a logic block to implement an additional XOR function as well as several other useful functions. With the invention, one bit of an adder can be formed using only a single lookup table, a carry multiplexer, and two multiplexers provided as part of the logic block. Multipliers, adders, counters, and loadable synchronous set-reset counters are all conveniently implemented with the invention. Even though the addition of a multiplexer increases the chip area slightly, the total chip resources required to implement many functions are less than when implemented in prior art structures.

DETAILED DESCRIPTION OF ONE EMBODIMENT OF THE INVENTION

Figure 1A:
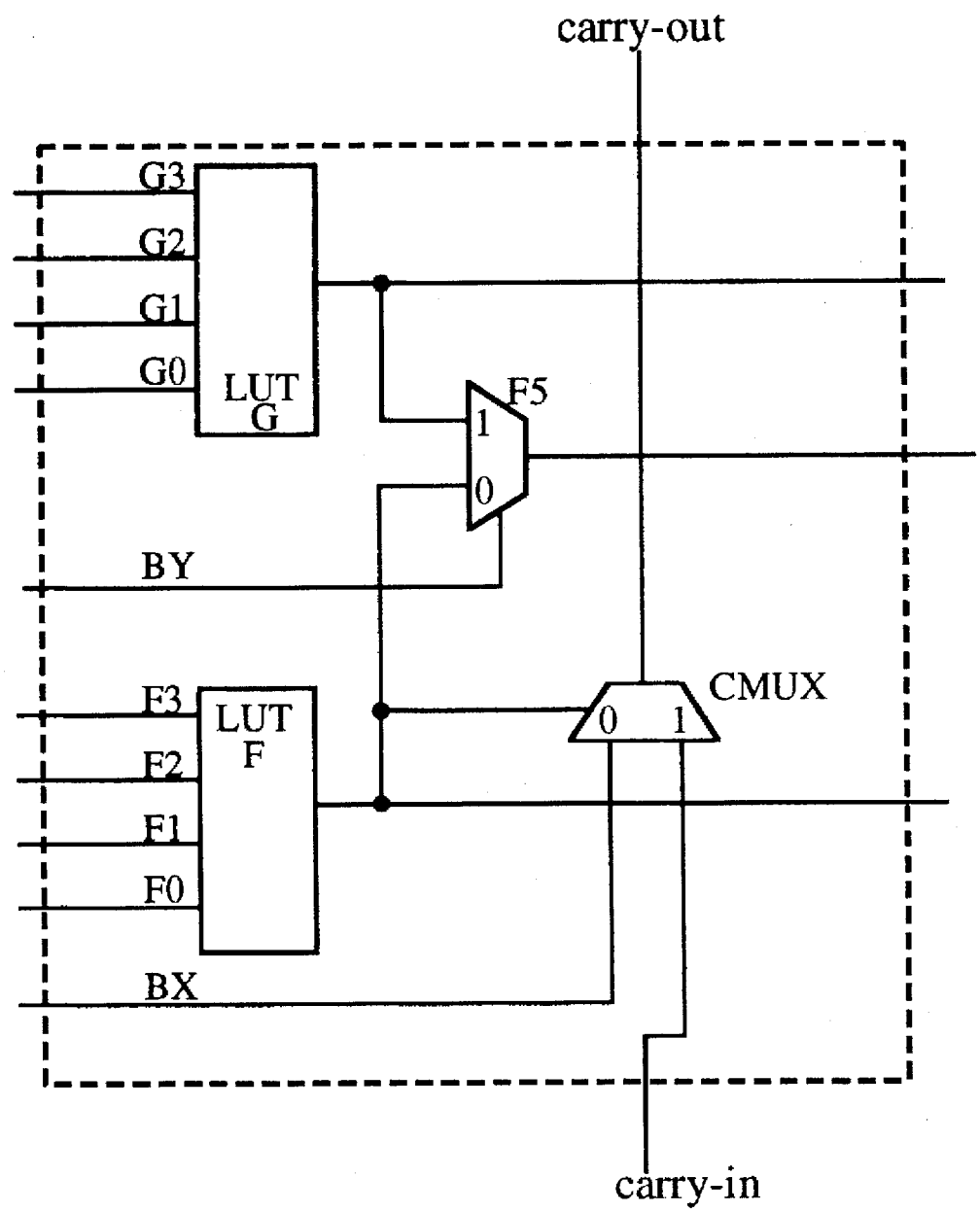
FIG. 1a shows a prior art structure for implementing arithmetic functions requiring carry.
Figure 2A:
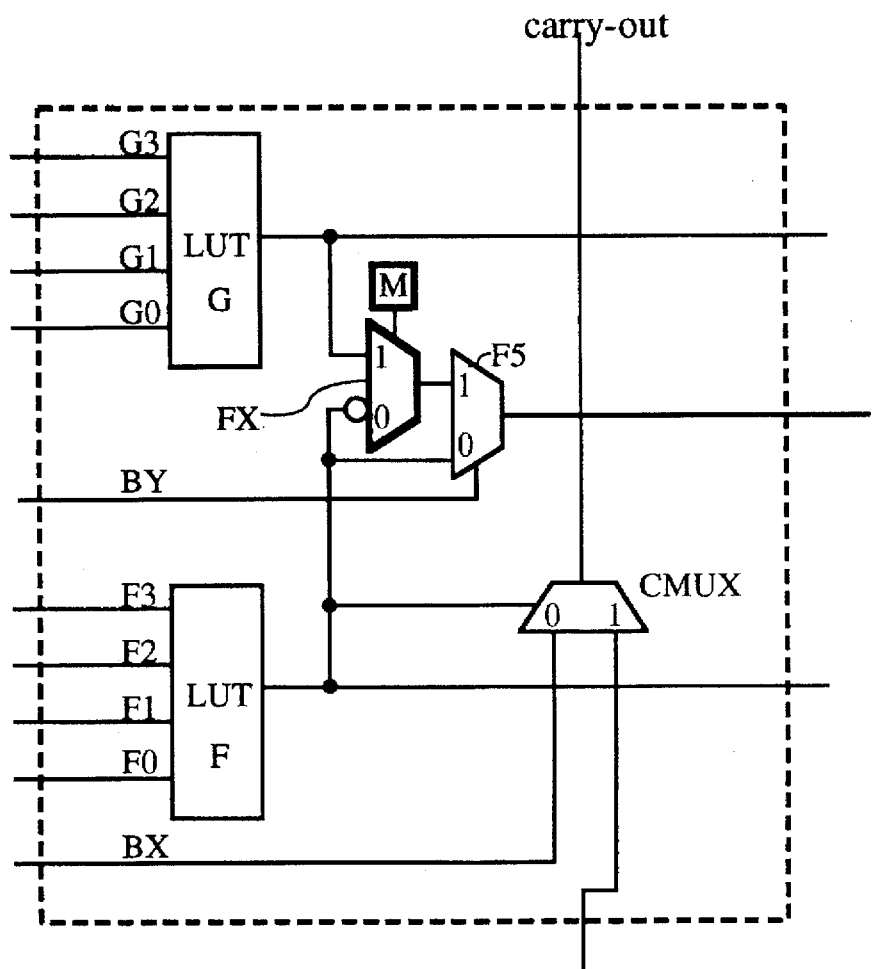
FIG. 2a shows a structure according to the invention for implementing arithmetic functions requiring carry.
Figure 3:
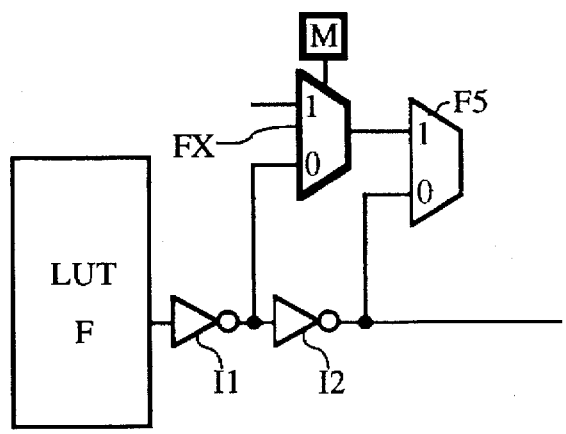
FIG. 3 shows how the inverted input signal to multiplexer FX is derived.

FIG. 2a shows one embodiment of the invention. Many portions of FIG. 2a correspond to those in FIG. 1a and are given the same labels. In addition, Multiplexer FX controlled by memory cell M is provided. Multiplexer FX receives the output signal from LUT G and the inverted output signal from LUT F. The output of Multiplexer FX is provided to multiplexer F5. If memory cell M carries a logic 1, the LUT G output signal is provided to multiplexer F5 and multiplexer F5 functions as in FIG. 1a. If memory cell M carries logic 0, then multiplexer F5 provides a choice of the inverted or noninverted output signal from LUT F as controlled by the signal on line BY. Thus the output signal from multiplexer F5 is the XOR function of the BY signal and the LUT F output signal. The inverted output signal from LUT F, which is represented by the bubble at the 0 input of multiplexer FX, is always available because the output signal is buffered through two inverters, not shown in FIG. 2a, and the inverted value is simply taken from the first inverter. FIG. 3 shows the two inverters I1 and I2 placed in series at the output of lookup table LUT F. The output signal from inverter I1 drives the 0 input terminal of multiplexer FX. The output signal from inverter I2 drives the 0 input terminal of multiplexer F5.

A fundamental advantage of the structure of FIG. 2a is that when multiplexers FX and F5 are used as an XOR gate, lookup table LUT G is available for other functions and thus the chip resources required for the arithmetic function are reduced.

Adder

Figure 1B:
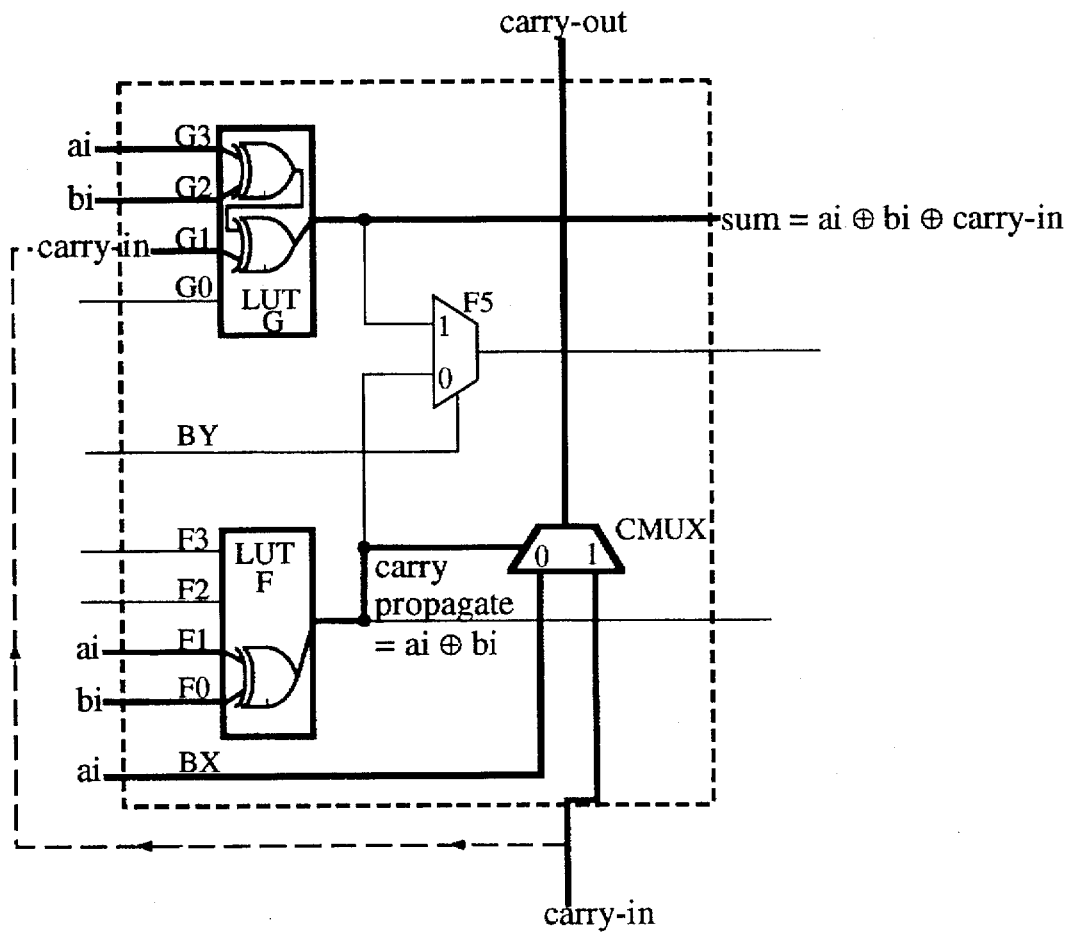
FIG. 1b shows the structure of FIG. 1a configured for implementing one bit of an adder.
Figure 2B:
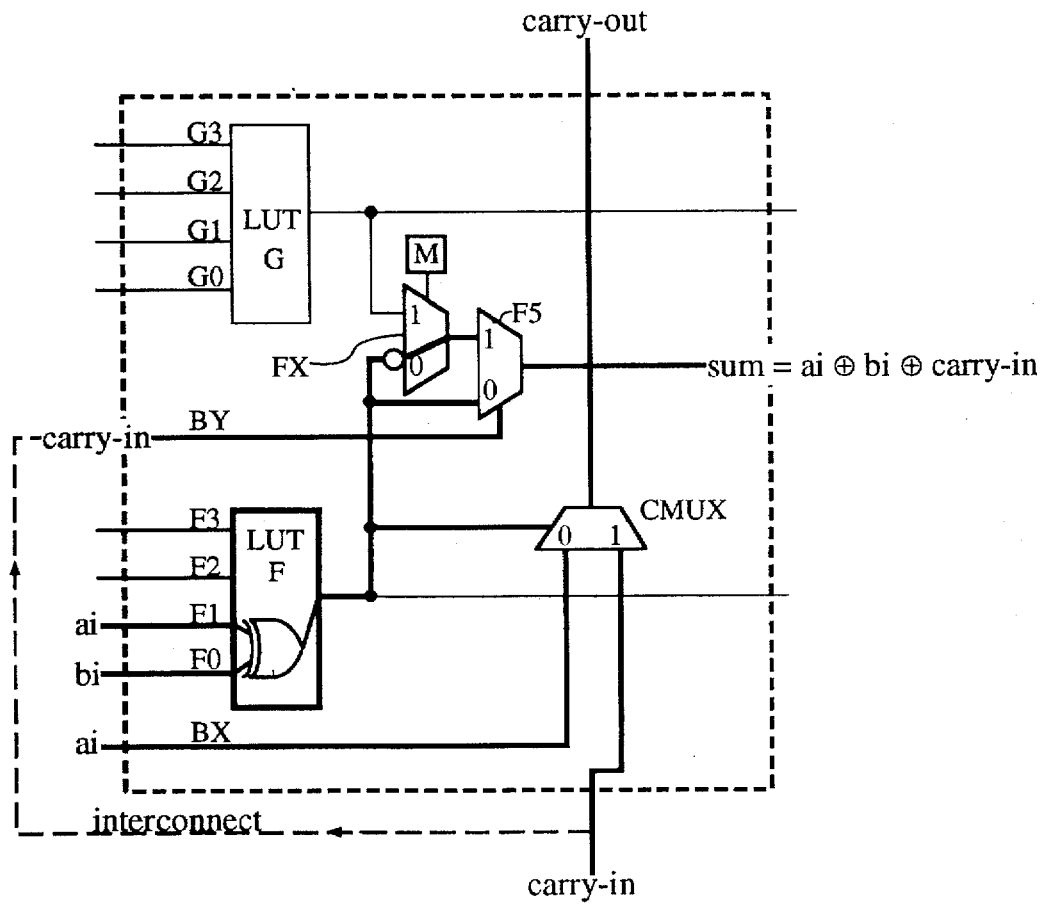
FIG. 2b shows the structure of FIG. 2a configured to implement an adder.

FIG. 2b shows the structure of FIG. 2a implemented as one bit of an adder (the function shown in FIG. 1b). Portions of the structure not used for the adder function are shown in faint lines and portions which implement the adder are shown in heavy lines. In FIG. 2b, the carry-in signal is applied to line BY and thus controls multiplexer F5. Thus the output of LUT F is the half sum $a_i \oplus b_i$ and the output of multiplexer F5 is the full sum $a_i \oplus b_i \oplus$ carry-in.

Multiplier

Consider a 4-bit by 4-bit multiplier for calculating $a_3a_2a_1a_0$ times $b_3b_2b_1b_0$. The calculation steps are shown in Table I below:

TABLE I

|   |   |   | times | $a_3$ $b_3$ | $a_2$ $b_2$ | $a_1$ $b_1$ | $a_0$ $b_0$ |
|---|---|---|---|---|---|---|---|
|   |   |   |   |   |   |   |   |
|   |   |   | $a_3b_0$ | $a_2b_0$ | $a_1b_0$ | $a_0b_0$ |
|   |   | + | $a_3b_1$ | $a_2b_1$ | $a_1b_1$ | $a_0b_1$ | 0 |
|   | + | $a_3b_2$ | $a_2b_2$ | $a_1b_2$ | $a_0b_2$ | 0 | 0 |
| + | $a_3b_3$ | $a_2b_3$ | $a_1b_3$ | $a_0b_3$ | 0 | 0 | 0 |
| $r_7$ | $r_6$ | $r_5$ | $r_4$ | $r_3$ | $r_2$ | $r_1$ | $r_0$ |

Figure 4A:
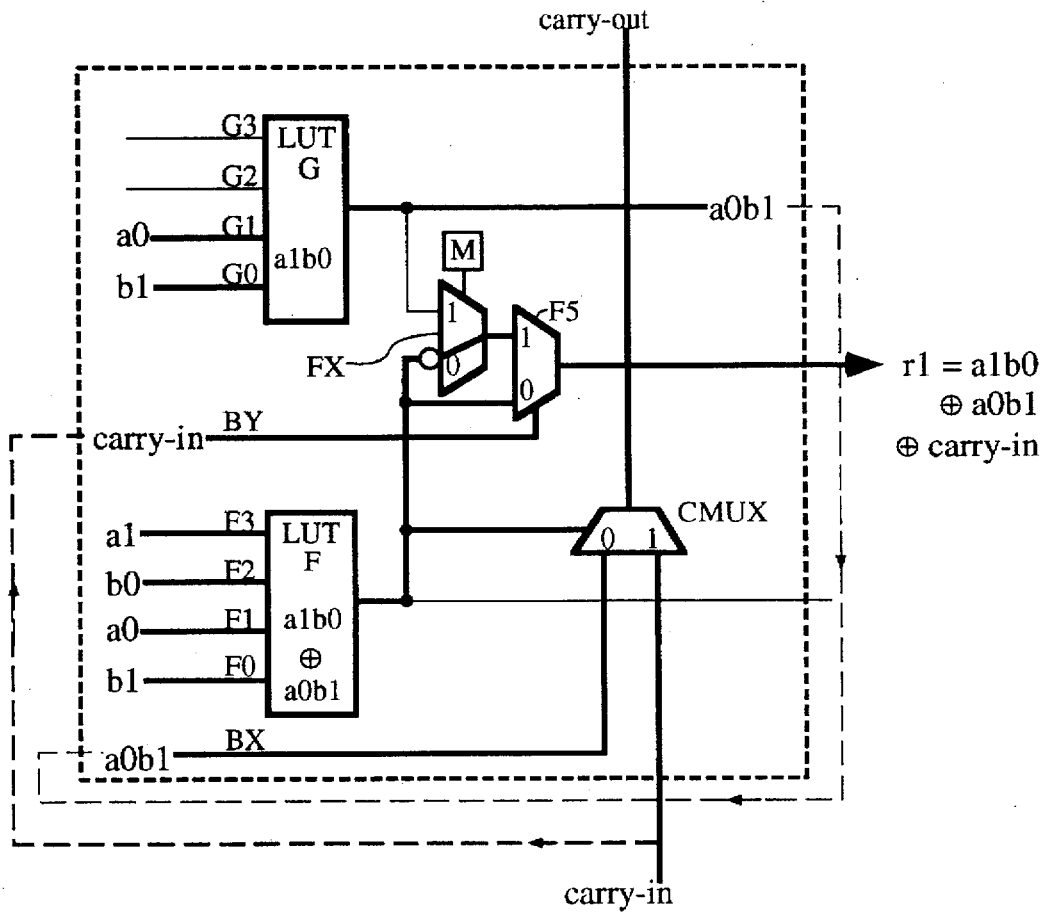
FIGS. 4a and 4b show logic blocks of the invention configured to generate two bits of a multiplier.

The configuration of FIG. 4a generates the r1 bit of the multiplication shown in Table I: $r1=a1b0+a0b1$. The circuit of FIG. 4a also generates the carry-out signal to be used as carry-in for the next bit. Lookup table LUT F performs the calculation $a1b0 \oplus a0b1$. Lookup table LUT G performs the calculation $a0b1$. This signal is routed through the FPGA general interconnect structure to the BX input terminal, and is used to generate the carry-out signal sent to the next more significant bit. The inventive structure allows the calculation to be done in two lookup tables. By contrast, with the structure of FIG. 1a, the calculation would require an extra lookup table.

Figure 4B:
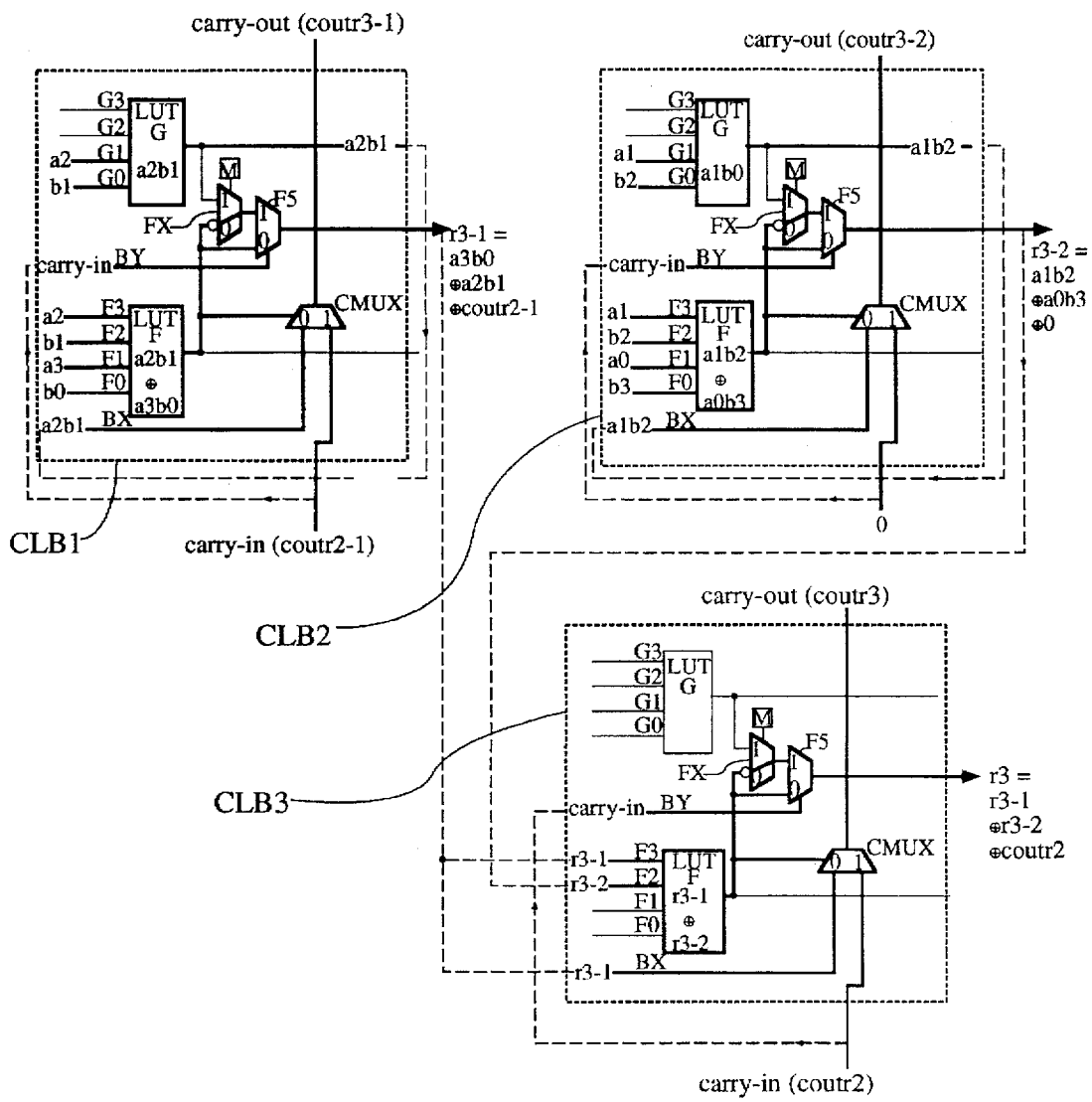

The type of equation generated in FIG. 4a is used repeatedly in a multiplier. FIG. 4b shows generation of $r_3$. In order to understand generation of multiplier bit $r_3$, the steps of Table I are shown in three tables. Tables II through IV, which correspond to calculations performed in FIG. 4b.

TABLE II

|   |   | $a_3b_0$ | $a_2b_0$ | $a_1b_0$ | $a_0b_0$ |
|---|---|---|---|---|---|
| + | $a_3b_1$ | $a_2b_1$ | $a_1b_1$ | $a_0b_1$ | 0 |
| $r_5-1$ | $r_4-1$ | $r_3-1$ | $r_2-1$ | $r_1-1$ | $r_0-1$ |

TABLE III

|   | $a_3b_2$ | $a_2b_2$ | $a_1b_2$ | $a_0b_2$ | 0 | 0 |
|---|---|---|---|---|---|---|
| + | $a_3b_3$ | $a_2b_3$ | $a_1b_3$ | $a_0b_3$ | 0 | 0 | 0 |
| $r_7-2$ | $r_6-2$ | $r_5-2$ | $r_4-2$ | $r_3-2$ | $r_2-2$ | $r_1-2$ | $r_0-2$ |

TABLE IV

|   |   | $r_5-1$ | $r_4-1$ | $r_3-1$ | $r_2-1$ | $r_1-1$ | $r_0-1$ |
|---|---|---|---|---|---|---|---|
| $r_7-2$ | $r_6-2$ | $r_5-2$ | $r_4-2$ | $r_3-2$ | $r_2-2$ | $r_1-2$ | $r_0-2$ |
| $r_7$ | $r_6$ | $r_5$ | $r_4$ | $r_3$ | $r_2$ | $r_1$ | $r_0$ |

Logic block CLB1 makes the calculation shown in Table II. The signals a2, b1, a3, and b0 are applied to terminals F3 through F0 of lookup table LUT F, which is programmed to make the calculation $a2b1 \oplus a3b0$. Lookup table LUT G of CLB1 makes the calculation $a2b1$ and this result is applied through interconnect lines to terminal BX of logic block CLB1. The carry-in terminal of logic block CLB1 receives the carry-out signal COUTr2–1, which is generated in another logic block not shown. Thus logic block CLB1 generates on its F5 output terminal the function r3–1, which can be seen in Table II to be $a3b0 \oplus a2b1$, and generates on its carry-out terminal the r3–1 carry-out signal COUTr3–1.

Similarly, logic block CLB2 makes the calculation shown in Table III. The signals a1, b2, a0, and b3 are applied to the F3 through F0 input terminals of lookup table LUTF and lookup table LUT F is programmed to generated the function $a1b2 \oplus a0b3$. The carry-in signal from r1–1 is always 0, as can be understood from Table III since $a0b2$ is always added to 0 and thus produces a logical 0 carry-out value. Thus logic block CLB2 generates in its F5 output terminal the function r3–2, which can be seen in Table III to be $a1b2 \oplus a0b3$. Logic block CLB2 generates on its carry-out terminal the r3–1 carry-out signal COUTr3–2.

Results from CLB1 and CLB2 are used in CLB3 to generate the final value r3. Lookup table LUT G is not used and is thus available for other functions. The signals r3–1 and r3–2 are applied to terminals F3 and F2 of lookup table LUT F, and lookup table LUT F is programmed to generate the function $r3-1 \oplus r3-2$, which is combined in multiplexers M and F5 with carry-in signal COUTr2 to generate the final output function $r3=r3-1 \oplus r3-2 \oplus COUTr2$.

Thus the invention saves one lookup table in generating bit r1 and three lookup tables in generating bit r3. The larger the arithmetic function, the greater the density increase provided by the multiplexer combination of the invention.

Parity Tree

Figure 5:
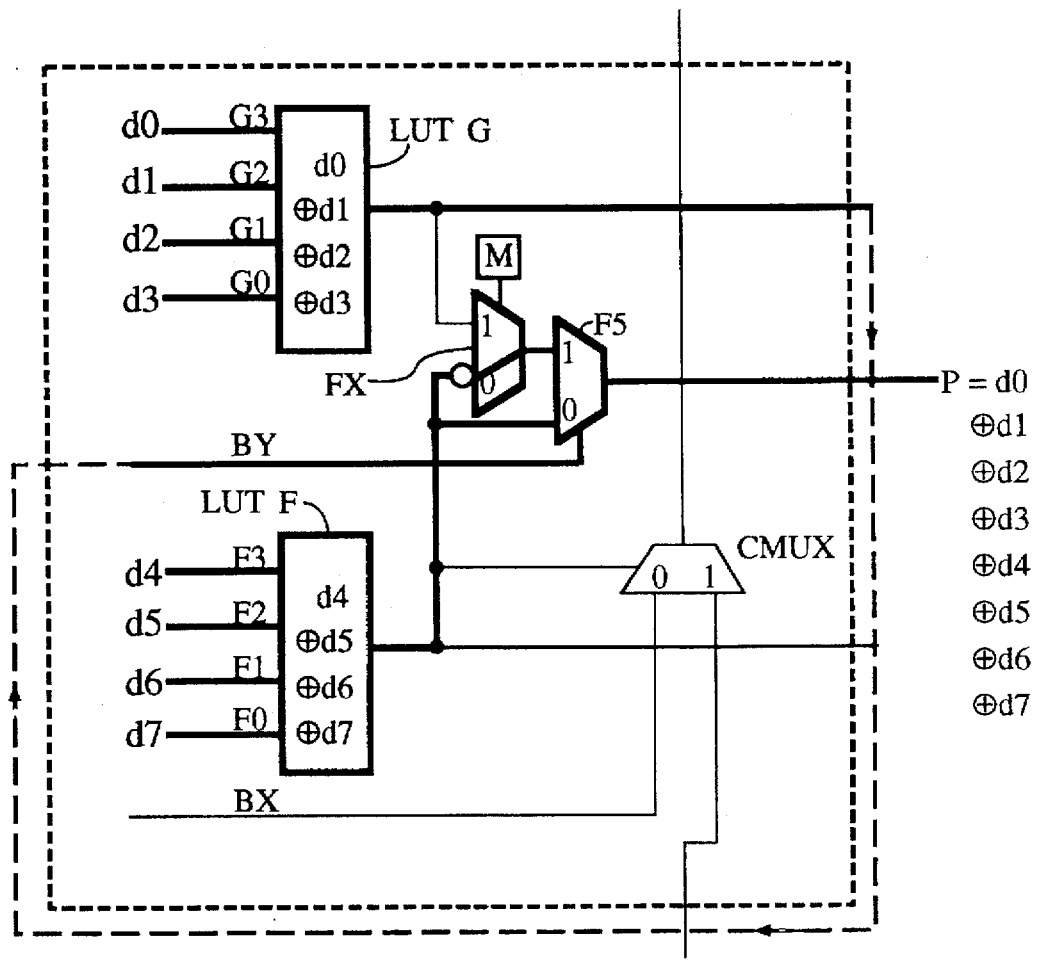
FIG. 5 shows a logic block of the invention configured to generate an 8-bit parity sum.

FIG. 5 shows the structure of FIG. 2 configured to implement an 8-bit wide parity tree. A parity sum of eight data bits d0 through d7 is generated by applying the eight data bits to the input terminals shown. General interconnect of the FPGA (not shown) is used to route the output signal from LUT G (the parity sum $d0 \oplus d1 \oplus d2 \oplus d3$) to terminal BY for controlling multiplexer F5. Multiplexer F5 receives inverted and noninverted parity sums $d4 \oplus d5 \oplus d6 \oplus d7$. Thus the output signal P of multiplexer F5 is the parity sum of the eight data bits $d0 \oplus d1 \oplus d2 \oplus d3 \oplus d4 \oplus d5 \oplus d6 \oplus d7$.

Complex Counter

Figure 6:
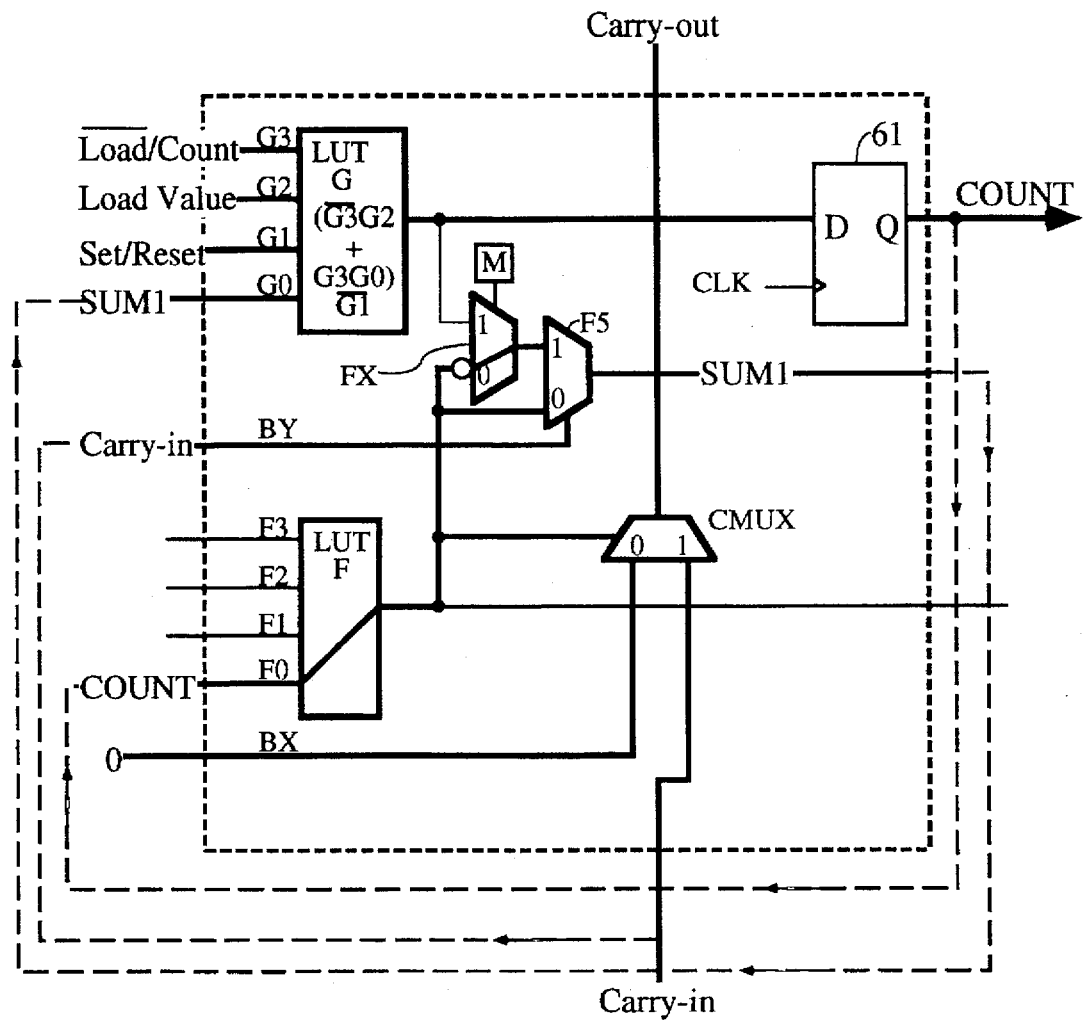
FIG. 6 shows the logic block of the invention configured to generate one bit of a parallel loadable set/reset counter.

FIG. 6 shows the structure of FIG. 2 used to implement one bit of a parallel loadable counter with a set/reset signal. Lookup table LUT G is programmed with the truth table $G=(\overline{G3}.G2+G3.G0).\overline{G1}$. This truth table causes G1 to be a reset signal. (The truth table $G=(\overline{G3}.G2+G3.G0)+G1$ would cause G1 to serve as a set signal.) The reset signal is applied to terminal G1. If reset is logical 1, then $\overline{G1}$ is logical 0 and the output of lookup table LUT G is logical 0 regardless of other input signals. If reset is logical 0 then other signals control the output value.

Typically the set/reset signal is globally controlled and thus resets all bits in the counter.

The Load/Count signal on G3 determines whether the counter will load a new value into the counter or will continue with a count. If $\overline{Load/Count}$ is logical 0, a new value is loaded from terminal G2 and if $\overline{Load/Count}$ is logical 1 then the SUM1 value at terminal G0 is stored in flip flop 61. For incrementing the register by 1, logical 0 is applied to each line BX for each bit in the counter, and logical 1 is applied to the carry-in terminal of the least significant bit. Each other bit of the counter receives its carry-in signal from the carry-out of the previous bit. When the counter of FIG. 6 is in its counting mode, SUM1 is passed through LUT G to D flip flop 61. When Load/Count is high, the SUM1 value is always one clock tick ahead of the COUNT value it increments. Lookup table LUT F is programmed to act as a feed through for the COUNT signal. This applies the COUNT value to the CMUX control terminal and to the XOR gate formed by multiplexers FX and F5. The Carry-in signal is applied to the control terminal of the F5 multiplexer, performing the XOR function. Thus the SUM1 signal is the sum of the Carry-in and COUNT values.

Without the extra multiplexer FX to complete the XOR function it would not be possible to separately calculate the sum and also provide both the set/reset and the load function within one logic block. Thus many useful benefits result from the addition of multiplexer FX.

In light of the above description, other embodiments of the invention will become obvious to those skilled in the art. For example, if an FPGA designer does not want to offer the function of five input variables, the two multiplexers can be replaced by an XOR gate.

We claim:

1. A field programmable gate array (FPGA) logic block structure comprising:

a first multiplexer having at least two data inputs and at least one control input;

a second multiplexer having at least two data inputs and at least one control input, said second multiplexer providing a first data input to said first multiplexer;

a first lookup table having a plurality of inputs, said first lookup table providing true and complement output signals, one as a second data input to said first multiplexer and one as a first data input to said second multiplexer;

a second lookup table having a plurality of inputs, said second lookup table providing a second data input to said second multiplexer; and a plurality of lines accessible from a general interconnect structure of an FPGA, one of said lines providing a control input to said first multiplexer, and other of said lines providing said inputs to said first and second lookup tables.

2. An FPGA logic block structure as in claim 1 further comprising:

a carry multiplexer having at least two data inputs and at least one control input, said carry multiplexer receiving as a first data input a carry-in signal from an upstream carry multiplexer and providing a carryout signal to a location external to said logic block; one of said lines providing a second data input to said carry multiplexer, said carry multiplexer receiving as a control input one of said true and complement output signals.

3. An FPGA logic block structure as in claim 2 wherein said location external to said logic block is a downstream multiplexer.

* * * * *